United States Patent [19]

Barkan

[11] Patent Number: 5,280,163
[45] Date of Patent: Jan. 18, 1994

[54] DRIVE CIRCUIT FOR RESONANT MOTORS

[75] Inventor: Edward Barkan, Miller Place, N.Y.

[73] Assignee: Symbol Technologies, Inc., Bohemia, N.Y.

[21] Appl. No.: 904,937

[22] Filed: Jun. 26, 1992

[51] Int. Cl.⁵ .............................................. G06K 7/10
[52] U.S. Cl. ..................................... 235/462; 359/199; 318/286
[58] Field of Search .................. 318/286, 289, 293; 235/462, 467, 472; 359/214, 221

[56] References Cited

U.S. PATENT DOCUMENTS

| | | | |
|---|---|---|---|
| 3,816,709 | 6/1974 | Walton | 235/439 |
| 3,952,217 | 4/1976 | Rawlings | 359/214 |
| 4,044,283 | 8/1977 | Allison | 359/214 |
| 4,387,297 | 6/1983 | Swartz et al. | 235/462 |
| 4,502,752 | 3/1985 | Montagu | 359/214 |
| 4,930,848 | 6/1990 | Knowles | 359/214 |
| 4,992,717 | 2/1991 | Marwin et al. | 318/696 |
| 5,003,164 | 3/1991 | Barkan | 235/472 |
| 5,009,473 | 4/1991 | Hunter et al. | 359/214 |
| 5,019,764 | 5/1991 | Chang | 318/627 |
| 5,126,545 | 6/1992 | Barkan | 235/467 |

*Primary Examiner*—Donald Hajec
*Assistant Examiner*—Adrian Young

[57] ABSTRACT

A drive circuit for a bar code scanner for driving an oscillatory resonant motor therein which periodically oscillates in opposite rotary directions to impart an oscillatory motion to a scanning mirror of the bar code scanner. In the disclosed drive arrangement, the motor is driven at its own natural resonant frequency, which requires very little current to maintain the oscillatory motion. A scanning beam is directed against the oscillating scanning mirror, which causes the beam to be periodically scanned across a field of view of the bar code scanner. A detector detects reflections of the scanned beam, as by a bar code symbol being scanned, and generates an output signal representative thereof. The resonant motor, having a rotor with a permanent magnet mounted thereon, drives the scanning mirror, and includes a drive winding positioned adjacent to the permanent magnet for applying a driving force thereto only in a first rotary direction, and a feedback winding also positioned adjacent to the permanent magnet for deriving a substantially sinusoidal feedback voltage as the permanent magnet periodically passes in opposite directions by the feedback winding. A drive circuit for the resonant motor includes a drive amplifier coupled to the feedback winding which is turned on only by positive halves of the feedback voltage. A driver transistor is coupled between the drive amplifier and the drive winding to drive the motor only during positive halves of the feedback voltage. A return biasing spring drives the rotor in the second rotary direction.

20 Claims, 4 Drawing Sheets

DRIVE CIRCUIT FOR RESONANT MOTORS

BACKGROUND OF THE INVENTION

1. Field of the Invention

The present invention relates generally to a drive circuit for a bar code scanner for driving an oscillatory resonant motor therein which periodically oscillates in opposite rotary directions to impart an oscillatory motion to a scanning mirror. More particularly, the subject invention pertains to a drive circuit for a resonant motor of a bar code scanner wherein the motor is driven at its own natural resonant frequency, which requires very little current to maintain the oscillatory motion.

2. Discussion of the Prior Art

Generally, the present invention relates to a scanning arrangement located within a bar code scanning device which is operative for repetitively scanning indicia having parts of different light reflectivity, for example, bar code symbols. The scanning arrangement is preferably mounted on a single printed circuit board located within a lightweight scanning device of a hand-held housing of gun-shaped configuration which may be readily held and manipulated by a user of the scanning device.

The utilization of laser scanning devices for the scanning and reading of information provided on a target, such as a package or sale item, is well known in this particular technology and has found wide acceptance in commerce. In this connection, various types of laser scanning devices incorporate scanning heads which house optical reading systems, such as bar code readers, for the reading of information or bar code symbols on targets which are scanned by a laser beam projected from the bar code reader. In general, such laser scanning devices, especially those in the type of bar code readers, are widely employed in industry, such as manufacturing, shipping, and in retail commerce and, for example, may be permanently incorporated in the structures of check-out counters of supermarkets, whereby the items of merchandise having the bar code symbols imprinted thereon or applied thereto are passed over a fixed bar code reader located beneath the counter surface so as to provide a record for the merchant of the merchandise being purchased by a consumer, and concurrently a readout (and possibly a printed record) for the consumer.

Alternatively, the bar code reader or laser scanning device may also be constituted of an optical scanner unit which is fixedly mounted on a stand extending above a support platform or countertop on which the merchandise may be arranged, or in many instances of utilization, pursuant to a preferred embodiment of the invention, may be in the form of a miniature, lightweight and gun-shaped device having a pistol grip, and which device is normally passed over the bar code symbol which is imprinted on a sale item or target at some short distance therefrom so as to enable scanning of the information provided by the bar code symbols.

Various optical readers and optical scanning systems have been developed heretofore for reading bar code symbols appearing on a label or on tile surface of an article. The bar code symbol itself is a coded pattern of indicia comprising a series of bars of various widths spaced apart from one another to bound spaces of various widths, the bars and spaces having different light-reflecting characteristics. The readers and scanning systems electro-optically transform the graphic indicia into electrical signals, which are decoded into alphanumerical characters that are intended to be descriptive of the article or some characteristic thereof. Such characters are typically represented in digital form and utilized as an input to a data processing system for applications, in point-of-sale processing, inventory control, and the like. Scanning systems of this general type have been disclosed, for example, in U.S. Pat. Nos. 4,251,798; 4,369,361; 4,387,297; 4,409,470; 4,760,248; and 4,896,026, all of which have been assigned to the same assignee as the instant application.

Among the foregoing, and in addition thereto, of particularly advantageous construction is a scan board module for laser scanners as illustrated and claimed in U.S. Pat. No. 5,015,833, which has also been assigned to the same assignee as the instant application, and the disclosure of which is incorporated herein by reference. In this connection, U.S. Pat. No. 5,015,833 discloses a scan board module contained in a generally lightweight hand-held gun-shaped housing which includes a printed circuit board on which optical and scanning components are mounted in an optically-aligned operative relationship. The printed circuit board is mounted within the housing, and the operative scanner components thereon are fastened thereto such that they are protected from damage caused by impacts or shocks sustained during rough handling or possible dropping of the scanning device. Moreover, the modular mounting of the various operative components on a single printed circuit board as disclosed and shown in this patent, as well as that elucidated particularly with regard to the embodiment of FIG. 2 of U.S. patent application Ser. No. 520,464, allows for a simple and highly efficient construction and functioning of the scanning arrangement.

As disclosed in some of the above patents, one embodiment of such a scanning system resides, inter alia, in a hand-held, portable laser scanning head supported by a user, which is configured to allow the user to aim the head, and more particularly, the light beam or laser beam projected therefrom, at a target and a symbol which is to be read.

The light source in a laser scanner is typically a gas laser or semiconductor laser. The use of semiconductor devices, such as a laser diode, as the light source in scanning systems is especially desirable because of their small size, low cost and low power requirements. The laser beam is optically modified, typically by a lens, to form a beam spot of a certain size at the target distance. It is preferred that the beam spot size at the target distance be approximately the same as the minimum width between regions of different light reflectivity, i.e., the bars and spaces of the symbol.

Bar code symbols are formed from bars or elements that are typically rectangular in shape with a variety of possible widths. The specific arrangement of elements defines the character represented according to a set of rules and definitions specified by the code or "symbology" used. The relative size of the bars and spaces is determined by the type of coding used, as is the actual size of the bars and spaces. The number of characters per inch represented by the bar code symbol is referred to as the density of the symbol. To encode a desired sequence of characters, a collection of element arrangements are concatenated together to form the complete bar code symbol, with each character of the message being represented by its own corresponding group of elements. In some symbologies a unique "start" and "stop" character is used to indicate where the bar code begins and ends. A number of different bar code symbologies exist. These symbologies include UPC/EAN, Code 39, Code 128, Codabar, and Interleaved 2 of 5.

For purpose of discussion, characters recognized and defined by a symbology shall be referred to as legitimate characters, while characters not recognized and defined by that symbology are referred to as illegitimate characters. Thus, an arrangement of elements not decodable by a given symbology corresponds to an illegitimate character(s) for that symbology.

In order to increase the amount of data that can be represented or stored on a given amount of surface area, several new bar code symbologies have recently been developed. One of these new code standards, Code 49, introduces a "two-dimensional" concept by stacking rows of characters vertically instead of extending the bars horizontally. That is, there are several rows of bar and space patterns, instead of only one row. The structure of Code 49 is described in U.S. Pat. No. 4,794,239, which is hereby incorporated by reference.

A one-dimensional single-line scan, as ordinarily provided by hand-held readers, has disadvantages in reading these two dimensional bar codes; that is, the reader must be aimed at each row individually. Likewise, the multiple-scan-line readers produce a number of scan lines at an angle to one another so these are not suitable for recognizing a Code 49 type of two-dimensional symbols.

Moreover, Wells U.S. Pat. No. 4,902,083 discloses a low vibration resonance scanning unit for miniature optical display apparatus, in which a resonance scanning unit employs a so-called tuning fork design. A scan mirror is mounted on one arm of a tuning fork, and a counter-balancing mass is mounted on the other arm of the tuning fork. Although this provides for the oscillation of the scan mirror to generate a raster display, the structure is relatively complex in nature and necessitates a plurality of components to produce the scanning operation.

In scanning systems known in the art, the light beam is directed by a lens or similar optical components along a light path toward a target that includes a bar code symbol on the surface. The scanning functions by repetitively scanning the light beam in a line or series of lines across the symbol. The scanning component may incorporate a drive or scanning motor adapted to either sweep the beam spot across the symbol and trace a scan line across and past the symbol in a high-speed repetitive mode, or scan the field of view of the scanner, or do both.

Scanning systems also normally include a sensor or photodetector which functions to detect light reflected from the symbol. The photodetector is therefore positioned in the scanner or in an optical path in which it has a field of view which extends across and slightly past the symbol. A portion of the reflected light which is reflected off the symbol is detected and converted into an electrical signal, and electronic circuitry or software decodes the electrical signal into a digital representation of the data represented by the symbol that has been scanned. For example, the analog electrical signal from the photodetector may typically be converted into a pulse width modulated digital signal, with the widths corresponding to the physical widths of the bars and spaces. Such a signal is then decoded according to the specific symbology into a binary representation of the data encoded in the symbol, and to the alphanumeric characters so represented.

The decoding process in known scanning systems usually works in the following way. The decoder receives the pulse width modulated digital signal from the scanner, and an algorithm implemented in software attempts to decode the scan. If the start and stop characters and the characters between them in the scan were decoded successfully and completely, the decoding process terminates and an indicator of a successful read (such as a green light and/or an audible beep) is provided to the user. Otherwise, the decoder receives the next scan, performs another decode attempt on that scan, and so on, until a completely decoded scan is achieved or no more scans are available.

Laser scanners are not the only type of optical instrument capable of reading bar code symbols. Another type of bar code reader is one which incorporates detectors based upon charge coupled device (CCD) technology. In such readers, the size of the detector is larger than or substantially the same as the symbol which is to be read. The entire symbol is flooded with light from the reader, and each CCD cell is sequentially read out to determine the presence of a bar or a space. Such readers are lightweight and easy to use, but require substantially direct contact or placement of the reader on the symbol to enable the symbol to properly read. Such physical contact of the reader with the symbol is a preferred mode of operation for some applications, or as a matter of personal preference by the user.

The present invention is related technically to the following U.S. patents and patent applications, which are commonly assigned and are in the same general technical area of drive circuits and motors for bar code scanners.

U.S. patent application Ser. No. 639,822, filed Jan. 10, 1991, discloses a drive circuit for a bar code scanner which includes a voltage drive amplifier with voltage feedback for driving a stepping motor for a scanning mirror in a laser bar code reader. The disclosed voltage drive circuit provides a highly damped, low q drive in which resonance is virtually eliminated. The stepping motor includes a rotor, a stator, a center-tapped AC winding and a DC winding. The motor drive circuit comprises a triangular waveform generator for generating a periodic triangular voltage signal. A driving circuit for the AC winding receives the periodic triangular voltage signal as an input, and includes a voltage feedback circuit in which the voltage across the AC winding is compared with and caused to follow the input voltage signal driving the AC winding. The drive circuit for the AC winding includes a first noninverting operational amplifier and a second inverting operational amplifier for driving respectively first and second phase sides of the AC winding. Each of the first and second operational amplifiers receives the triangular voltage signal as a first input signal and also receives as a second input a feedback signal representing respectively the voltage across the first and second phase sides of the AC winding. The circuit also includes first and second low output impedance emitter follower drives coupled respectively to the outputs of the first and second operational amplifiers for driving respectively the first and second phase sides of the AC winding. A drive circuit for the DC winding utilizes a microstepping voltage feedback signal obtained from the AC winding for compensating for an angular offset between the AC and DC windings, and includes an operational amplifier for combining a DC voltage drive signal with the microstepping voltage feedback signal.

U.S. Pat. No. 5,003,164, for a Portable Laser Scanning System and Scanning Methods Having a Motor Amplitude Regulator Circuit, discloses a laser bar code scanner having a high speed scanning motor controlled by a motor amplitude regulator circuit which automatically controls the amplitude of oscillation of the shaft of the high speed scanning motor. Amplitude control is accomplished by using a closed loop control system that supplies the AC stator windings of the scanning motor with periodic triangular current waveforms for energizing and de-energizing the AC stator coils. The signal that closes the control loop is a feedback signal obtained from the DC stator windings of the motor which indicates the amplitude of oscillation. By controlling the amplitude of oscillation, the high speed scanning motor can maintain a consistent scanning speed and uses less power.

U.S. Pat. No. 5,019,764, for a Portable Laser Scanning System and Resonant Motor Control Circuit, discloses a laser bar code scanner having a high speed scanning motor controlled by a resonant motor circuit which automatically controls the frequency and amplitude of oscillation of the high speed scanning motor. The frequency and amplitude control is accomplished by using a single feedback signal, which is a second harmonic of the driving current, and is obtained from the windings of the Motor, which indicates resonance and also measures the amplitude of oscillation. The circuit is utilized to tune and maintain the motor in a resonant oscillating mode. Controlling both the frequency and amplitude of oscillation of the high speed scanning motor allows the motor to maintain a consistent scanning speed and to use less power.

SUMMARY OF THE INVENTION

Accordingly, it is a primary object of the present invention to provide a drive circuit for a bar code scanner for driving an oscillatory resonant motor therein which periodically oscillates in opposite rotary directions to impart an oscillatory motion to a scanning mirror.

A further object of the subject invention is the provision of a drive circuit for a resonant motor of a bar code scanner wherein the motor is driven at its own natural resonant frequency, which requires very little current to maintain the oscillatory motion and makes the system excellent for battery powered applications.

Moreover, a drive circuit and resonant motor as described herein should have a long functional life, which makes the present invention an excellent candidate for fixed mount applications.

In accordance with the teachings herein, the present invention provides a drive circuit which is simpler than known prior art resonant drives, and has several advantages, including the ability to operate at low power supply voltages, and to start the motor rapidly by applying a large percentage of the available power supply voltage to the motor drive winding. The drive circuit drives the motor in one direction only, which is important because it minimizes the number of components in series with the drive winding, which maximizes the voltage available to be applied to the drive winding during start-up. The drive circuit is designed to operate with a simple motor having a single moving magnet rotor and a single stationary coil bobbin with two windings, a drive winding and a feedback winding, which minimizes system costs.

The present invention provides a bar code scanner having a scanning mirror which is periodically driven in oscillation in first and second opposite rotary directions. A scanning beam is directed against the scanning mirror, which causes the beam to be periodically scanned across a field of view of the bar code scanner. A detector detects reflections of the scanned beam, as by a bar code symbol being scanned, and generates an output signal representative thereof.

A resonant motor, having a rotor with a permanent magnet mounted thereon, drives the scanning mirror, and includes a drive winding positioned adjacent to the permanent magnet for applying a driving force thereto in a first rotary direction only, and a feedback winding also positioned adjacent to the permanent magnet for deriving a substantially sinusoidal feedback voltage as the permanent magnet periodically passes by the feedback winding in opposite directions. First halves of the sinusoidal feedback voltage are generated as the permanent magnet passes thereby in the first rotary direction, and second halves of the sinusoidal feedback voltage are generated as the magnet passes thereby in the second opposite rotary direction. A return biasing spring applies a return biasing force to the rotor in the second rotary direction.

A drive circuit for the resonant motor includes a drive amplifier coupled to the feedback winding which is turned on only by first halves of the feedback voltage and is turned off by second halves of the feedback voltage. A driver transistor is coupled at its input to the drive amplifier, and is coupled at its output to the drive winding to drive the rotor only during first halves of the feedback voltage. The return biasing spring drives the rotor in the second rotary direction, such that the motor is driven at its natural resonant frequency, which determines the frequency of the feedback voltage.

In a preferred embodiment, the first halves of the sinusoidal feedback voltage are positive halves, and the second halves of the sinusoidal feedback voltage are negative halves, although it should be apparent that a symmetrically opposite polarity circuit embodiment is also within the teachings of the present invention.

One alternative embodiment of the present invention derives feedback information from both the positive and negative peaks of the feedback voltage, which results in faster settling times at the regulated amplitude. In this alternative embodiment, the motor is still driven in a single direction, and magnetic coupling between the drive and feedback windings should be minimized as much as possible.

In greater detail, the drive circuit also includes a negative peak detector coupled to the feedback winding to receive the generated feedback voltage. The output of the negative peak detector is more positive with a smaller amplitude rotary deflection. An error comparator amplifier is coupled to the negative peak detector at a first input thereto, and is coupled to a reference voltage at a second input. A variable resistor FET is coupled at its input to the error comparator amplifier, and is coupled at its output to the drive amplifier. In operation, a more positive voltage from the error comparator amplifier reduces the resistance of the variable resistor FET which increases the gain of the drive amplifier, thereby increasing the current applied to the drive winding at smaller amplitude rotary deflections. Moreover, the magnitude of the reference voltage can be adjusted to adjust the amplitude of oscillation of the motor.

The negative peak detector comprises a diode having its anode coupled to the feedback winding, and its cathode coupled through a parallel arrangement of a resistor and a capacitor to the reference voltage.

One advantage of driving the motor only during positive half cycles of the generated feedback voltage is that the negative peak detector charges only during negative half cycles. This is important because the waveforms of the positive half cycles can be distorted by inductive coupling between the drive winding and the feedback winding when current flows through the drive winding. Since this happens only on positive half cycles, the peak detector is not affected thereby, so the feedback signal remains accurate.

The drive circuit also generates a start-up pulse for the resonant motor, wherein a capacitor is coupled between the feedback winding and the drive amplifier, and the capacitor receives a charging current when a voltage is first applied to the circuit, which passes through a series resistor and a resistor coupled to ground, to generate a voltage pulse for the drive amplifier. At start-up the voltage generated at the feedback winding is low, which turns on the error comparator amplifier, which drives the variable resistor fully on, which turns up the gain of the drive amplifier to cause the driver transistor to apply a large magnitude current to the drive winding.

A comparator also compares the negative peak detector voltage to a reference voltage, and when the amplitude of angular deflection of the rotor is properly regulated, the input from the peak detector will be lower than the reference voltage. However, if the system is not properly regulated, the peak detector voltage will rise which will trip the comparator, such that in the event of a motor failure in a laser scanning system, the tripping of the comparator can be used to turn off a laser scanning beam generator. The feedback voltage is also directed to a zero crossover detector, which develops a start-of-scan timing signal for a decoder for the bar code scanner.

BRIEF DESCRIPTION OF THE DRAWINGS

The foregoing objects and advantages of the present invention for a drive circuit for resonant motors may be more readily understood by one skilled in the art with reference being had to the following detailed description of a preferred embodiment thereof, taken in conjunction with the accompanying drawings wherein like elements are designated by identical reference numerals throughout the several views, and in which.

DETAILED DESCRIPTION OF THE DRAWINGS

Figure 1:
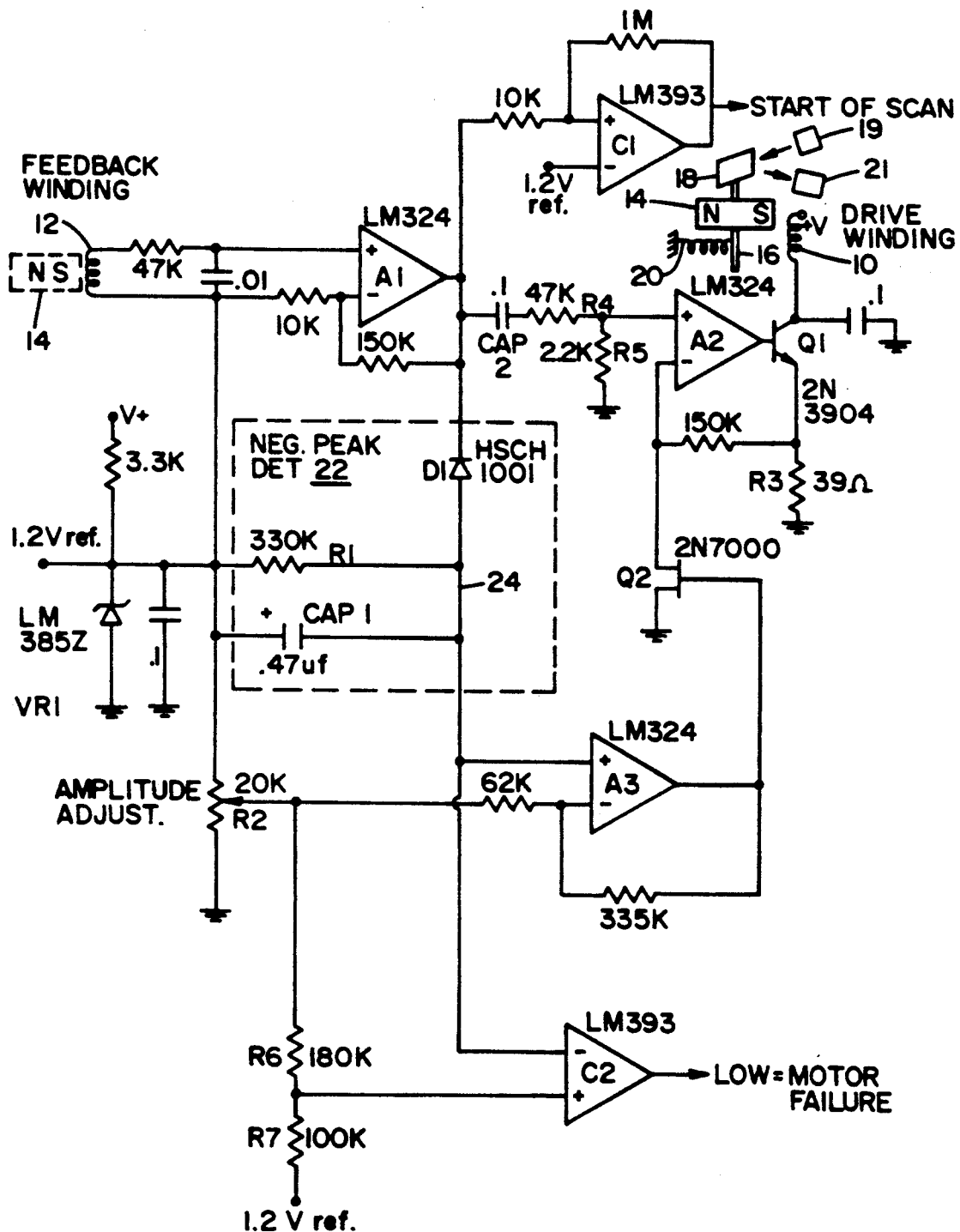
FIG. 1 is an electrical schematic for a drive circuit particularly designed for use with a resonant motor in which the rotor is oscillated in opposite rotary directions and which includes a rotor with a permanent magnet, a drive coil, and a feedback coil.

Referring to the drawings in detail, FIG. 1 is an electrical schematic for a drive circuit particularly designed for use with a Mylar motor as described in patent application Ser. No. 07/812,923, filed Dec. 4, 1991 for a Scanning Arrangement and Method, also partially illustrated in FIGS. 5 and 6 herein. However, the drive circuit of the present invention can be used to drive other types of resonant motors as described herein in which the rotor is periodically oscillated in opposite rotary directions to impart an oscillatory motion to a scanning mirror of a bar code scanner.

The drive circuit of the present invention is simpler than other known prior art resonant drive circuits, and has several advantages as described herein. The drive circuit of FIG. 1 shows electrical values and components designed for a motor with a resonant frequency of about 20 Hz, and operates as follows. In the schematic of FIG. 1, the two windings on the motor coil bobbin are a drive winding 10 and a feedback winding 12. A magnet 14, illustrated adjacent to drive winding 10 and in phantom adjacent to feedback winding 12, is mounted to the rotor 16, with the magnet 14 being located adjacent the coil bobbin windings 10 and 12. Initially, a current applied to the drive winding imparts motion to the magnet 14 and the structure mounted thereto, such as a scanning mirror 18 of a bar code scanner and a motor return spring 20.

A return spring 20 is illustrated schematically, and can be a Mylar leaf spring as described in patent application Ser. No. 07/812,923, a torsional spring, or any appropriate biasing means. As is known in the art, during operation of a bar code scanner, a suitable scanning beam generator 19, such as a laser or laser diode, directs a beam against the oscillating scanning mirror 18, which causes the beam to be periodically scanned across a field of the bar code scanner. Reflections of the scanned beam, as by a bar code symbol being scanned, are detected by a suitable detector 21 which generates an analog signal representative thereof.

Motion of the rotor magnet 14 generates a small feedback voltage in the feedback winding 12 which during normal operation is approximately sinusoidal in waveform. Positive half cycles are generated when the rotor is moving in a first rotary direction, and negative half cycles are generated when the rotor is moving in the second opposite rotary direction. Zero crossings of the generated feedback voltage occur upon reversal of the direction of travel.

Amplifier A1 amplifies the generated feedback voltage at the feedback winding, and the amplified output is directed to a comparator C1 which detects zero crossings of the amplified feedback voltage. The comparator C1 compares the amplified feedback voltage with a reference voltage, e.g. 1.2 V. During operation, the output of the comparator C1 goes high when the motor is rotating in one direction, and low when it is rotating in the second opposite direction. The output of the comparator C1, labeled START OF SCAN, is used by a bar code decoder of the bar code reader, as a transition on the START OF SCAN output indicates to the decoder that a scan is about to start.

The output of amplifier A1 is also AC coupled through a capacitor CAP2 and a resistor R4, with a shunt resistor R5 to ground, to the input of an amplifier A2. The resistor R5 to ground at the input to A2 causes the AC coupled signal to be centered about ground. On positive half cycles of the amplified feedback voltage, the output of amplifier A2 turns on a drive transistor Q1 which applies current to the motor drive winding, and on negative half cycles, Q1 is turned off. Thus the motor is driven only in the first rotary direction, and the motor centering spring 20 drives the motor in the opposite rotary direction when the drive current is turned off. When the motor reverses direction again, the generated feedback voltage goes positive again and again turns on Q1, etc. In this way, the motor provides a self-sustaining oscillation, with the frequency of oscillation being determined by the natural resonant frequency of the motor, because it determines the frequency of the generated feedback voltage, which determines when drive current is applied to the motor.

Since the motor is driven at its own natural resonant frequency, very little current is required to maintain oscillatory motion, which makes this system excellent for battery powered applications.

The mechanical angle over which the motor oscillates is unstable with the circuitry as described thus far. If the motor is disturbed, the generated voltage will change, which changes the drive current, which changes the motor motion, which changes the generated feedback voltage, etc. Accordingly, it is necessary to regulate the amplitude of the motor operation, i.e. the amplitude of the angular deflections of the rotor. Regulation is also necessary to maintain a constant amplitude with temperature fluctuations as the return spring 20 stiffness can change with temperature. Regulation of the operating amplitude also helps the motor start up fast, as described hereinbelow.

The amplitude is regulated as follows. Diode D1, capacitor CAP1 and resistor R1 form a negative peak detector 22. The voltage at the anode of D1 is proportional to the amplitude of the generated feedback voltage, and is therefore proportional to the amplitude of the mechanical motion.

An error amplifier A3 compares the peak detector output voltage at 24 to a reference voltage supplied at the arm of an adjustable potentiometer R2. The peak detector voltage at 24 is more positive at smaller rotor angular displacements, and conversely is less positive at larger rotor angular displacements. If the peak detector voltage is more positive than the voltage at the arm of R2, the output of A3 goes positive, thereby applying the positive voltage to the gate of Q2, which is an FET that operates as a variable resistor. A higher voltage on the gate of Q2 reduces its resistance, which increases the gain of drive amplifier A2. This in turn increases the current that is applied by drive transistor Q1 to the drive winding of the motor, thereby increasing the rotor angular displacement with a force generally inversely proportional to the angular displacement.

Accordingly, error amplifier A3 controls the drive current to the motor, initially supplying large drive currents at smaller angular displacement and supplying less drive current at larger angular displacements, until the peak detector output voltage and the voltage at the arm of R2 are approximately the same. In view thereof, R2 can be used to adjust the amplitude of oscillation of the motor. The supply voltage applied across R2 is regulated by a voltage regulator VR1, which provides a regulated and steady reference output voltage despite minor variations in the power supply voltage. Accordingly, the motor amplitude will not change even when the power supply voltage fluctuates slightly.

The drive circuit of the present invention takes advantage of the single direction drive in a significant design factor. The motor is only driven during positive half cycles of the generated feedback voltage, and the negative peak detector in turn charges only during negative half cycles. This is important because the waveforms during the positive half cycles can be distorted by inductive coupling between the drive and feedback windings when current flows through the drive winding. Since this happens only on positive half cycles, the peak detector is unaffected thereby, so that the feedback signal remains accurate.

A motor with a drive circuit as described hereinabove will not necessarily start up reliably. If the motor is not moving, a feedback voltage is not generated. Therefore, no feedback signal is applied to the input of A2, Q1 is not turned on, and the motor is not driven.

However, if a very slight motion is imparted to the motor, the circuit will begin to operate as described hereinabove. The drive circuit of the present invention ensures start-up by applying a start-up current pulse to the drive winding 10 when power is first applied to the circuit. The start-up current pulse causes the motor to start moving, at which time the drive circuit and motor sustain oscillatory motion.

The start-up current pulse is generated as follows. When power is first applied to the circuit, one terminal of capacitor CAP2 is at the 1.2 volt reference voltage provided by VR1 through diode D1, and the other terminal is at ground through resistors R4 and R5 (when the motor is not moving). Accordingly, when power is initially applied to the circuit, CAP2 charges through the two resistors R4 and R5 at the input to A2. This causes a voltage pulse to be generated across resistor R5 at the input to A2 which momentarily turns on Q1. As soon as the motor starts to move, current controlled by the generated voltage at the feedback winding is applied to the drive winding as described hereinabove. Initially, the generated feedback voltage is low, so A3 operating as described hereinabove turns Q2 on fully, which turns the gain of A2 up to maximum. This causes Q1 to initially apply a large magnitude current to the drive winding 10, thus rapidly driving up the motor amplitude. As described hereinabove, as the proper amplitude is approached, A3 turns down the gain of A2, and the drive current is reduced to a small magnitude (just enough to maintain the desired amplitude) when the voltage at 24 reaches the amplitude of the reference voltage selected by the setting of R2.

Figure 1A:
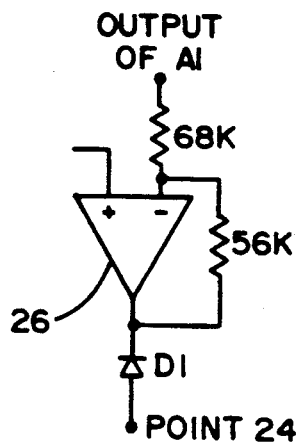
FIG. 1A illustrates a modification of the circuit of FIG. 1.

FIG. 1A illustrates a modified version of FIG. 1 which is designed to make the motor settle at its final amplitude with a minimum of overshoot. In the embodiment of FIG. 1A, an extra op-amp 26, connected in FIG. 1 as shown, inverts the generated voltage signal at the output of A1, such that peak detector cap (CAP1) is charged on the inverted positive peaks. CAP1 is now charged twice as often so that the voltage across CAP1 more closely tracks the motor amplitude during start-up acceleration. This, in turn, turns down the gain of the drive amplifier A2 sooner when the motor reaches its proper amplitude. If distortion of the positive peaks upsets the peak detector, the additional op-amp 26 can have a gain of slightly less than one so that it only charges the peak detector 22 during start-up acceleration, when each successive half cycle is larger than the previous half cycle. Once the motor reaches its steady state amplitude, the output of the amplifier 26 is too low to charge the peak detector 22, so that any distortion on the positive peaks will have no effect. Accordingly, the embodiment of FIG. 1A derives feedback information from both the positive and negative peaks of the feedback voltage, which results in faster settling times at the regulated amplitude. In this alternative embodiment the motor is still driven in a single direction, and magnetic coupling between the drive and feedback windings should be minimized as much as possible.

Figure 2:
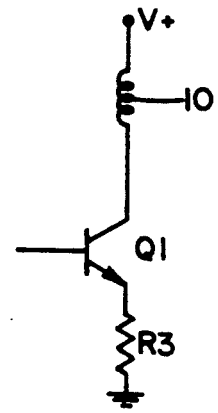
FIG. 2 illustrates the small number of components connected in series with the drive winding, which maximizes the voltage available to be applied to the drive winding during start-up.

The drive circuit drives the motor in one direction only, which is important because it minimizes the number of components in series with the drive winding, as shown by FIG. 2. This maximizes the voltage available to be applied to the drive winding during start-up.

Figure 3:
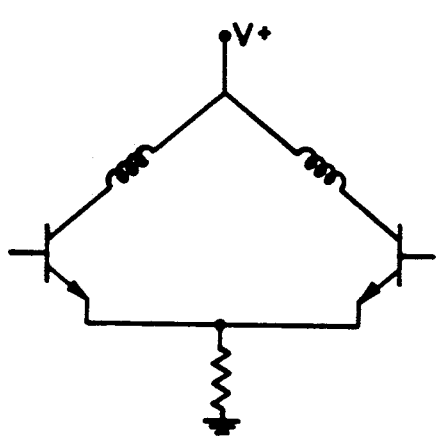
FIG. 3 illustrates a first approach to drive a motor in two directions in which the drive winding is wound with a center tap associated with two drive transistors.
Figure 4:
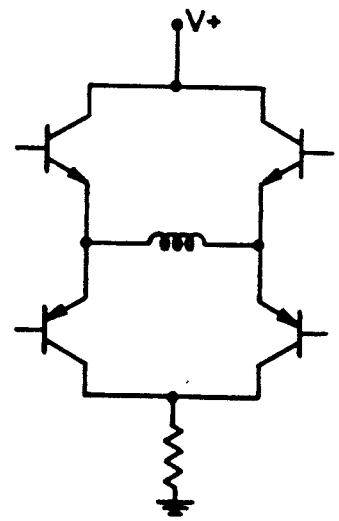
FIG. 4 illustrates a second approach to drive a motor in two directions in which a bridge driver is used which has two diagonally opposed transistors in series with the winding at any one time, and in which diagonally opposed pairs of transistors are alternately turned on to apply current in one direction or the other through the coil.

If the motor were driven in both directions, one of two approaches could be used. In a first approach as illustrated in FIG. 3, the drive winding could be wound with a center tap associated with two drive transistors as illustrated, which reduces the number of winding turns by one half, which for a given current applies only half as much force to the motor. In a second approach as illustrated in FIG. 4, a bridge driver could be used which has two diagonally opposed transistors in series with the winding at any one time. In the bridge configuration of FIG. 4, diagonally opposed pairs of transistors are alternately turned on to apply current in one direction or the other through the coil. This arrangement works well with large supply voltages, but at low voltages the circuit design must be rather elaborate if the voltage drop across the transistors is to be minimized. Without this elaborate circuitry, more than half of the available power supply voltage would be lost at low supply voltages (around 3 volts).

A further comparator C2 compares the negative peak detector voltage to a percentage of the voltage on the arm of R2 provided by the voltage divider circuit R6, R7. When the amplitude of deflection of the rotor is being properly regulated, the input from the peak detector will be lower than the reference voltage. If the system goes out of regulation for any reason, the peak detector voltage will rise above the reference voltage which will trip comparator C2. In the event of a motor failure in a laser scanning system, the tripping of comparator C2 can be used to turn off a laser scanning beam generator, as required by some safety regulations.

Figure 5:
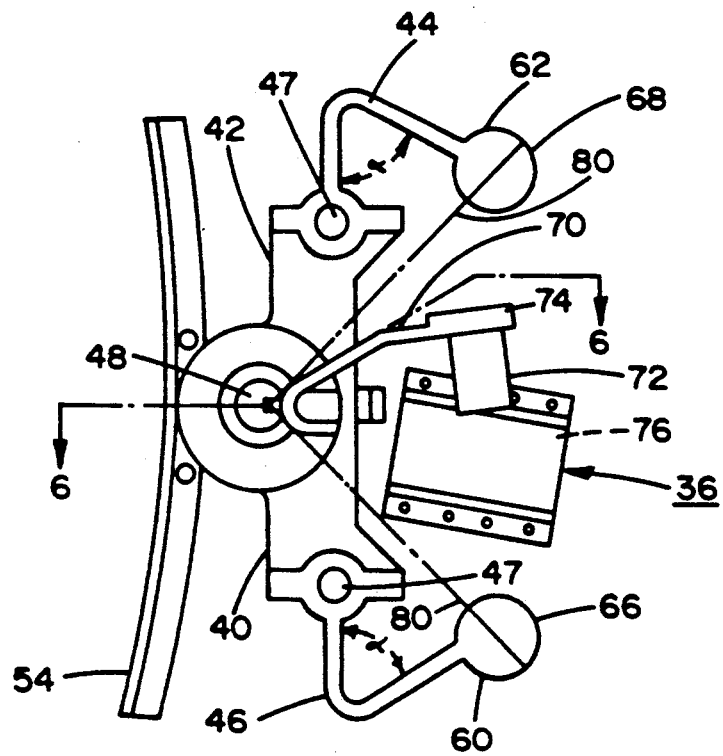
FIG. 5 illustrates, on an enlarged scale, a sectional view through a portion of a Mylar scanning motor constructed pursuant to patent application Ser. No. 07/812,923 for a Scanning Arrangement and Method.
Figure 6:
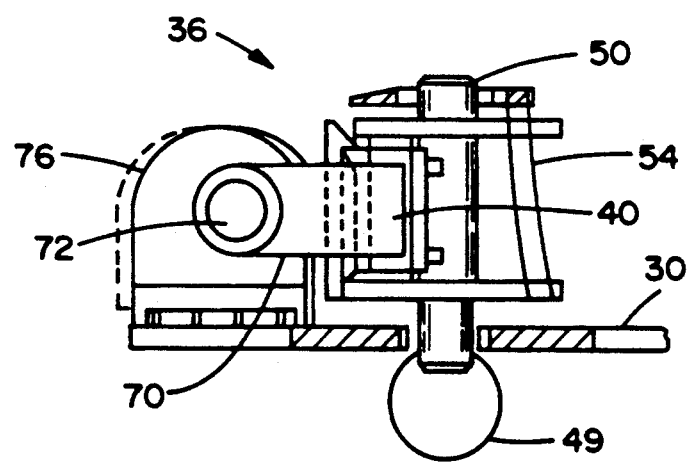
FIG. 6 illustrates a sectional view taken along line 6—6 in FIG. 5.

FIGS. 5 and 6 illustrate the assembled components of a scanning arrangement 36 for a Mylar motor, as described in greater detail in patent application Ser. No. 07/812,923, filed Dec. 4, 1991, for a Scanning Arrangement and Method. The scanning arrangement 36 includes an upstanding support member 40 having a central portion in the shape of an elongate bracket 42 with extending generally L-shaped bent arms 44, 46 projecting from its opposite ends, with each of the arms subtending an acute angle $\alpha$. The elongate generally rectangular bracket 42 is mounted on a printed circuit board 30 through the intermediary of suitable fasteners (not shown) extending through holes 47 formed in the ends of the bracket and engaging into threaded bores of a trunnion 49. The bracket 42 includes an apertured central portion 48 for the swivable support of a post 50 having a lower end extending through the board 30 to be journaled in the trunnion 49 which is positioned to extend across the lower surface of the printed circuit board 30. The post 50 includes a bracket to which there is fastened a suitable scan element 54, such as a plano-concave scan mirror, so as to be oscillatable about an axis extending coaxially through the post. Fastened to the post 50 is a projecting arm member 70 having a magnet 72 mounted on the outer distal end 74 thereof, which magnet is adapted to be electrically alternatingly attracted to or repelled from the interior of an electrically energized and electromagnetic coil structure 76 mounted on the printed circuit board 30. The magnet is movable into and out of an aperture in the coil, thereby resultingly oscillating the arm member 70 and post 50 and imparting a reciprocating oscillatory movement to the scan mirror 54.

A flat leaf spring 80 formed from a sheet of Mylar is provided in order to control the extent of the oscillatory movement of the scan mirror 54, and to essentially restore or bias the scan mirror towards its centered position. The distal ends 44, 46 of each of the bent arm members 42 of the structure bracket 42 are provided with clamping components, such as hemispherical cylindrical extensions 60, 62 cooperating with complementary clamping members 66, 68 adapted to be fastened thereon, with the leaf spring being secured therebetween. The leaf spring 80 extends through a notch formed in the post 50, and also engages the arm supporting the magnet, such that the central portion of the mylar leaf spring 80 is clamped to the rotatable post 50 supporting the scan mirror 54. The opposite ends of the mylar spring are clamped between the respective hemispherically cross-sectional clamping elements 60, 66; 62, 68 at the outer ends of the arms 42 so as to be fixedly engaged therebetween. Hereby, the spring is bent into two arm segments, for example, at a right angle or 90° to each other extending from the attachment to the post 50 towards each end while tensioned by the flexible arm members 44, 46. This provides a resilient biasing restoring action on the scan mirror 54 opposite to the oscillatory movement imparted to the scan mirror by the energizing effect of the magnet, thereby reciprocating the mirror between its end positions. In effect, during operation of the scanning arrangement, each time an energizing pulse is applied to the coil, the magnet is drawn into the central opening or aperture into the coil, thereby pulling all of the oscillatable components therewith, and concurrently bending the leaf spring. Each of the arms of the leaf spring is generally planar, while upon being displaced responsive to the oscillation of the magnet, each arm of the leaf spring is bent so as to store energy therein. Upon being bent, the leaf spring then releases its stored energy, thereby displacing the magnet and the scan mirror back into and past its centered normal at rest position, with the entire assembly oscillating in a damped manner. This particular structure ensures a controlled oscillation of the scan mirror between the two end positions thereof so as to afford a uniform scan operation for reading information on a target object.

With the exception of the construction of the leaf spring 80 being constituted from mylar, the remaining components of the scanning arrangement 36 as set forth hereinabove, with the exception of the scan mirror, may be formed of a molded plastic material, for example, such as lexan or the like. The simplicity of construction, with a modular mounting of the entire scanning arrangement on the printed circuit board 30, effectively protects the arrangement against externally produced shocks and impacts encountered during any possible dropping or rough handling of the scanning device, while concurrently rendering the construction thereof inexpensive in nature and easily and quickly capable of being serviced.

Figure 7:
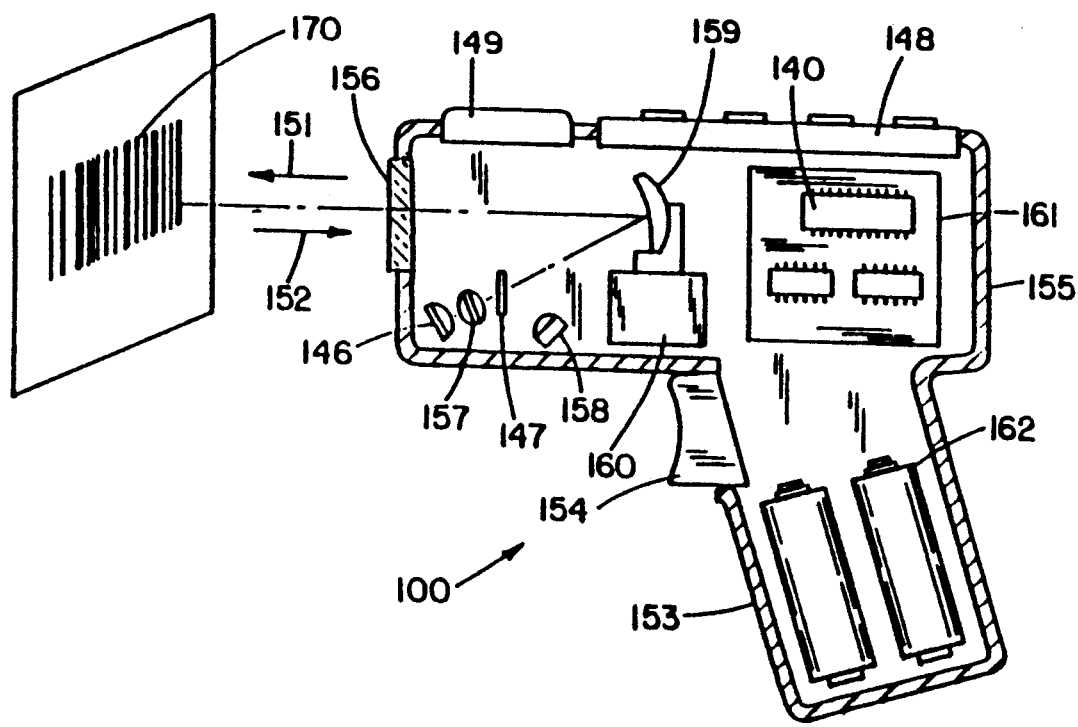
FIG. 7 illustrates a highly simplified embodiment of one type of bar code reader which can be utilized in association with the drive circuit for resonant motors of the present invention.

FIG. 7 illustrates a highly simplified embodiment of one type of bar code reader that may be utilized in association with the drive circuit for resonant motors of the present invention. A reader 100 may be implemented in a hand-held scanner, as illustrated, or a desktop workstation or stationery scanner. In a preferred embodiment, the arrangement is implemented in a housing 155 that includes an exit port 156 through which an outgoing laser light beam 151 is directed to impinge on, and to be scanned across, symbols 170 located exteriorly of the housing.

The hand-held device of FIG. 7 is generally of the style disclosed in U.S. Pat. No. 4,760,248 issued to Swartz et al., or in U.S. Pat. No. 4,896,026 assigned to symbol Technologies, Inc., and also similar to the configuration of a bar code reader commercially available as part number LS 8100 or LS 2000 from Symbol Technologies, Inc. Alternatively, or in addition, features of U.S. Pat. No. 4,387,297 issued to Swartz et al. or U.S. Pat. No. 4,409,470 issued to Shepard et al., both such patents assigned to Symbol Technologies, Inc., may be employed in constructing the bar code reader unit of FIG. 7. These U.S. Pat. Nos. 4,760,248, 4,896,026 and 4,409,470 are incorporated herein by reference but the general design of such devices will be briefly described here for reference.

Referring to FIG. 7 in more detail, an outgoing light beam 151 is generated in the reader 100, usually by a laser diode or the like, and directed to impinge upon a bar code symbol disposed on a target a few inches from the front of the reader unit. The outgoing beam 151 is scanned in a scan pattern, and the user positions the hand-held unit so this scan pattern traverses the symbol to be read. Reflected light 152 from the symbol is detected by a light-responsive device 158 in the reader unit, producing serial electrical signals to be processed and decoded for reproducing the data represented by the bar code.

In a preferred embodiment, the reader unit 100 is a gun shaped device having a pistol-grip type of handle 153, and movable trigger 154 is employed to allow the user to activate the light beam 151 and detector circuitry when pointed at the symbol to be read, thereby saving battery life if the unit is self-powered. A lightweight plastic housing 155 contains the laser light source, the detector 158, the optics and signal processing circuitry, and the CPU 140 as well as power source or battery 162. A light-transmissive window 156 in the front end of the housing 155 allows the outgoing light beam 151 to exit and the incoming reflected light 152 to enter. The reader 100 is designed to be aimed at a bar code symbol by the user from a position in which the reader 100 is spaced from the symbol, i.e., not touching the symbol or moving across the symbol. Typically, this type of hand-held bar code reader is specified to operate in the range of perhaps several inches.

As further depicted in FIG. 7, a suitable lens 157 (or multiple lens system) may be used to focus the scanned beam onto the bar code symbol at an appropriate reference plane. A light source 146 such as a semiconductor laser diode is positioned to introduce a light beam into the axis of the lens 157, and the beam passes through a partially silvered mirror 147 and other lenses or beam-shaping structure as needed, along with an oscillating mirror 159, driven by the voltage drive circuit of the present invention, which is attached to a scanning motor 160 activated when the trigger 154 is pulled. If the light produced by the source 146 is not visible, an aiming light, if needed, produces a visible-light spot which may be fixed, or scanned just like the laser beam; the user employs this visible light to aim the reader unit at the symbol before pulling the trigger 154.

While several embodiments and variations of the present invention for a drive circuit for resonant motors are described in detail herein, it should be apparent that the disclosure and teachings of the present invention will suggest many alternative designs to those skilled in the art.

What is claimed is:

1. A bar code scanner comprising:
   a. a light source for generating a light beam;
   b. a scanning mirror which is periodically driven in oscillation in first and second rotary directions, wherein said light beam is directed against the scanning mirror which causes the beam to be scanned across a field of view of the bar code scanner, and a detector for detecting reflections of the scanned beam, as by a bar code symbol being scanned, and for generating an output signal representative thereof;
   c. a resonant motor, having a rotor with a permanent magnet mounted thereon, which drives said scanning mirror, a drive winding positioned adjacent to said permanent magnet for applying a driving force thereto in said first rotary direction only, and a feedback winding also positioned adjacent to said permanent magnet for deriving a substantially sinusoidal feedback voltage as the permanent magnet passes by the feedback winding, with first halves of the sinusoidal feedback voltage being generated as the permanent magnet passes thereby in the first rotary direction, and second halves of the sinusoidal feedback voltage being generated as the magnet passes thereby in the second rotary direction, and a return biasing means for applying a return biasing force to the rotor in the second rotary direction; and
   d. a drive circuit for said resonant motor, including a drive amplifier coupled to said feedback winding which is turned on by said first halves of the feedback voltage and is turned off by said second halves of the feedback voltage, and a driver coupled at its input to said drive amplifier and coupled at its output to said drive winding for driving the rotor only during said first halves of the feedback voltage, with said return biasing means driving the rotor in the second rotary direction, whereby the motor is driven at its natural resonant frequency which determines the frequency of the feedback voltage.

2. A bar code scanner as claimed in claim 1, wherein said first halves of the sinusoidal feedback voltage are positive halves, and said second halves of the sinusoidal feedback voltage are negative halves.

3. A bar code scanner as claimed in claim 1, wherein said feedback voltage is also directed to a zero crossover detector, which develops a start-of-scan timing signal for a decoder for the bar code scanner.

4. A bar code scanner comprising:
a. a light source for generating a light beam;
b. a scanning mirror which is periodically driven in oscillation in first and second rotary directions, wherein said light beam is directed against the scanning mirror which causes the beam to be scanned across a field of view of the bar code scanner, and a detector for detecting reflections of the scanned beam, as by a bar code symbol being scanned, and for generating an output signal representative thereof;
c. a resonant motor, having a rotor with a permanent magnet mounted thereon, which drives said scanning mirror, a drive winding positioned adjacent to said permanent magnet for applying a driving force thereto in said first rotary direction only, and a feedback winding also positioned adjacent to said permanent magnet for deriving a substantially sinusoidal feedback voltage as the permanent magnet passes by the feedback winding, with first positive halves of the sinusoidal feedback voltage being generated as the permanent magnet passes thereby in the first rotary direction, and second negative halves of the sinusoidal feedback voltage being generated as the magnet passes thereby in the second rotary direction, and a return biasing means for applying a return biasing force to the rotor in the second rotary direction; and
d. a drive circuit for said resonant motor, including a drive amplifier coupled to said feedback winding which is turned on by said first positive halves of the feedback voltage and is turned off by said second negative halves of the feedback voltage, and a driver coupled at its input to said drive amplifier and coupled at its output to said drive winding for driving the rotor only during said first positive halves of the feedback voltage, with said return biasing means driving the rotor in the second rotary direction, whereby the motor is driven at its natural resonant frequency which determines the frequency of the feedback voltage, said drive circuit further comprising a negative peak detector coupled to aid feedback winding to receive the generated feedback voltage, an error amplifier coupled to said negative peak detector at a first input thereto, and coupled to a reference voltage at a second input, with the output of the negative peak detector being more positive with a smaller amplitude rotary deflection, and a variable resistor means coupled at its input to said error amplifier, and coupled at its output to said drive amplifier, wherein a more positive voltage from said error amplifier reduces the resistance of said variable resistor which increases the gain of said drive amplifier, thereby increasing the current applied to said drive winding.

5. A bar code scanner as claimed in claim 4, wherein at start-up the voltage generated at said feedback winding is low, which turns on said error amplifier, which drives said variable resistor fully on, which turns up the gain of said drive amplifier to cause said driver to apply a large magnitude current to said drive winding.

6. A bar code scanner as claimed in claim 5, wherein the motor is only driven during positive half cycles of the generated feedback voltage, and the negative peak detector charges during negative half cycles, thereby preventing distortion of the waveforms of the positive half cycles by inductive coupling between the drive winding and the feedback winding when current flows through the drive winding, and rendering the feedback signal to be accurate.

7. A bar code scanner as claimed in claim 6, wherein a potentiometer is provided to adjust the magnitude of the reference voltage, and thereby the amplitude of oscillation of the rotor.

8. A bar code scanner as claimed in claim 7, wherein said variable resistor comprises an FET operating as a variable resistor.

9. A bar code scanner as claimed in claim 8, wherein said negative peak detector comprises a diode having its anode coupled to said feedback winding, and its cathode coupled through a parallel arrangement of a resistor and a capacitor to said reference voltage.

10. A bar code scanner as claimed in claim 9, further including means for generating a start-up pulse for the resonant motor, including a capacitor coupled between said feedback winding and said drive amplifier which receives a charging current when voltage is first applied to the circuit, which passes through a series resistor and a resistor coupled to ground, to generate a voltage pulse for said drive amplifier.

11. A bar code scanner as claimed in claim 10, further including a comparator for comparing the negative peak detector voltage to a reference voltage, and when the amplitude of angular deflection of the rotor is properly regulated, the input from the peak detector will be lower, and if the system is not properly regulated, the peak detector voltage will rise which will trip the comparator, such that in the event of a motor failure in a laser scanning system, the tripping of the comparator is used to turn off a laser beam source.

12. A bar code scanner as claimed in claim 11, wherein said feedback voltage is also directed to a zero crossover detector, which develops a start-of-scan timing signal for a decoder for the bar code scanner.

13. A bar code scanner as claimed in claim 4, further including a comparator for comparing the negative peak detector voltage to a reference voltage, and when the amplitude of angular deflection of the rotor is properly regulated, the input from the peak detector will be lower, and if the system is not properly regulated, the peak detector voltage will rise which will trip the comparator, such that in the event of a motor failure in a laser scanning system, the tripping of the comparator is used to turn off a laser beam source.

14. A bar code scanner comprising;
a. a light source for generating a light beam;
b. a scanning mirror which is periodically driven in oscillation in first and second rotary directions, wherein said light beam is directed against the scanning mirror which causes the beam to be scanned across a field of view of the bar code scanner, and a detector for detecting reflections of the scanned beam, as by a bar code symbol being scanned, and for generating an output signal representative thereof;
c. a resonant motor, having a rotor with a permanent magnet mounted thereon, which drives said scanning mirror, a drive winding positioned adjacent to said permanent magnet for applying a driving force thereto in said first rotary direction only, and a feedback winding also positioned adjacent to said permanent magnet or deriving a substantially sinusoidal feedback voltage as the permanent magnet passes by the feedback winding, with first halves of the sinusoidal feedback voltage being generated as the permanent magnet passes thereby in the first rotary direction, and second halves of the sinusoidal feedback voltage being generated as the magnet passes thereby in the second rotary direction, and a return biasing means for applying a return biasing force to the rotor in the second rotary direction; and d. a drive circuit for said resonant motor, including a drive amplifier coupled to said feedback winding which is turned on b said first halves of the feedback voltage and is turned off by said second halves of the feedback voltage, and a driver coupled at its input to said drive amplifier and coupled at its output to said drive winding for driving the rotor only during said first halves of the feedback voltage, with said return biasing means driving the rotor in the second rotary direction, whereby the motor is driven at its natural resonant frequency which determines the frequency of the feedback voltage, said drive circuit further comprising a negative peak detector coupled to said feedback winding to receive the generated feedback voltage, an error amplifier coupled to said negative peak detector at a first input thereto, and coupled to a reference voltage at a second input, with the output of the negative peak detector being more positive with a smaller amplitude rotary deflection, and a variable resistor means coupled at its input to said error amplifier, and coupled at its output to said drive amplifier, wherein a more positive voltage rom said error amplifier reduces the resistance of said variable resistor which increases the gain of said drive amplifier, thereby increasing the current applied to said drive winding.

15. A bar code scanner as claimed in claim 4, wherein at start-up the voltage generated at said feedback winding is low, which turns on said error amplifier, which drives said variable resistor fully on, which turns up the gain of said drive amplifier to cause said driver to apply a large magnitude current to said drive winding.

16. A bar code scanner as claimed in claim 15, wherein the motor is only driven during positive half cycles of the generated feedback voltage, and the negative peak detector charges during negative half cycles, thereby preventing distortion of the waveforms of the positive half cycles by inductive coupling between the drive winding and the feedback winding when current flows through the drive winding, and rendering the feedback signal to be accurate.

17. A bar code scanner as claimed in claim 16, wherein a potentiometer is provided to adjust the magnitude of the reference voltage, and thereby the amplitude of oscillation of the rotor.

18. A bar code scanner as claimed in claim 17, wherein said variable resistor comprises an FET operating as a variable resistor.

19. A bar code scanner as claimed in claim 18, wherein said negative peak detector comprises a diode having its anode coupled to said feedback winding, and its cathode coupled through a parallel arrangement of a resistor and a capacitor to said reference voltage.

20. A bar code scanner as claimed in claim 19, further including means for generating a start-up pulse for the resonant motor, including a capacitor coupled between said feedback winding and said drive amplifier which receives a charging current when voltage is first applied to the circuit, which passes to a series resistor and a resistor coupled to ground, to generate a voltage pulse for said drive amplifier.

* * * * *